(12) United States Patent
Emde et al.

(10) Patent No.: US 11,124,168 B2
(45) Date of Patent: Sep. 21, 2021

(54) METHOD FOR CONTROLLING A HYDRAULIC BRAKE SYSTEM

(71) Applicant: Robert Bosch GmbH, Stuttgart (DE)

(72) Inventors: Christoph Emde, Leingarten (DE); Heiko Druckenmueller, Mundelsheim (DE); Holger Kurz, Stuttgart (DE); Patrick Schellnegger, Ludwigsburg (DE); Yakup Navruz, Heilbronn (DE); Andreas Schmidtlein, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 16/415,103

(22) Filed: May 17, 2019

(65) Prior Publication Data
US 2019/0367001 A1 Dec. 5, 2019

(30) Foreign Application Priority Data

May 30, 2018 (DE) .................... 10 2018 208 594.3

(51) Int. Cl.
*B60T 8/40* (2006.01)
*B60T 13/70* (2006.01)
*B60T 8/173* (2006.01)
*B60T 8/1755* (2006.01)

(52) U.S. Cl.
CPC .............. *B60T 13/70* (2013.01); *B60T 8/173* (2013.01); *B60T 8/1755* (2013.01); *B60T 8/4068* (2013.01); *B60T 2270/30* (2013.01)

(58) Field of Classification Search
CPC .... B60T 8/4059; B60T 8/4068; B60T 8/4291; B60T 8/48; B60T 13/66; B60T 13/686
See application file for complete search history.

(56) References Cited

U.S. PATENT DOCUMENTS

| 5,876,102 A | * | 3/1999 | Mori | B60T 8/173 303/156 |
| 2013/0026818 A1 | * | 1/2013 | Schmidt | B60T 8/4059 303/139 |
| 2015/0291137 A1 | * | 10/2015 | Takeuchi | B60T 8/34 303/10 |
| 2019/0184958 A1 | * | 6/2019 | Watanabe | B60T 13/142 |
| 2019/0366996 A1 | * | 12/2019 | Emde | B60T 8/4054 |
| 2019/0366999 A1 | * | 12/2019 | Emde | B60T 8/4068 |

FOREIGN PATENT DOCUMENTS

GB 2486062 A * 6/2012 ............ B60T 8/4872

* cited by examiner

*Primary Examiner* — Bradley T King
(74) *Attorney, Agent, or Firm* — Maginot, Moore & Beck LLP

(57) ABSTRACT

In a hydraulic brake system, which includes: a hydraulic pump which is driven by an electric motor and has the purpose of generating a fluid volume flow for the hydraulic brake system; a hydraulic connection for conducting the fluid volume flow between the hydraulic pump and a wheel brake; a reservoir for storing a fluid volume; wherein the reservoir is connected to the hydraulic connection by means of a switching valve, a method includes actuating the switching valve in such a way that by this means a fluid pulsation in the hydraulic connection is counteracted. Furthermore, the method may be implemented with a control unit and a hydraulic brake system.

17 Claims, 3 Drawing Sheets

METHOD FOR CONTROLLING A HYDRAULIC BRAKE SYSTEM

This application claims priority under 35 U.S.C. § 119 to application no. DE 10 2018 208 594.3, filed on May 30, 2018 in Germany, the disclosure of which is incorporated herein by reference in its entirety.

The present disclosure relates to a method for controlling a hydraulic brake system, wherein the brake system comprises: a hydraulic pump which is driven by an electric motor and has the purpose of generating a fluid volume flow for the hydraulic brake system, a hydraulic connection for conducting the fluid volume flow between the hydraulic pump and a wheel brake, a reservoir for storing a fluid volume, wherein the reservoir is connected to the hydraulic connection by means of a switching valve, wherein the method is characterized according to the disclosure in that the switching valve is actuated in such a way that by this means a fluid pulsation in the hydraulic connection is counteracted. Furthermore, the disclosure relates to a control unit and to a hydraulic brake system.

BACKGROUND

Driver assistance systems such as ESP require valves and a pressure supply unit in order to actively engage in the pressure modulation of the wheel brake calipers. The design which is used most frequently is the radial piston pump in combination with an eccentric which is driven by an electric motor. When operation at a constant rotational speed occurs, intake phases and delivery phases of the pump alternate periodically. The delivered volume flow is not constant over time for reasons of the design but instead has a half-sine profile in the case of 2c systems (one radial piston pump per circuit, and with two brake circuits). These fluctuations give rise to audible pressure pulsations. In the case of 6c systems (three radial piston pumps per circuit), the zero delivery phases are eliminated but the delivered volume flow is not constant over time here either but rather fluctuates.

In addition to these pulsations—and independently of the number of pumps—the opening of the pulse outlet valves generates pressure pulses which are perceived as "pump rattling". The pulsations are transmitted into the vehicle passenger compartment via structural vibrations of the hydraulic lines and are perceived as disturbing noises by the driver. This correspondingly has an NVH (noise-vibration-harshness) problem. In order to reduce the high-frequency pulsations which cause this, low-pass filter components (series connection of a capacitance and a throttle) can be installed. Disadvantages here are the costs of the damping measure, and also the throttle results in an additional load for the pump and motor.

SUMMARY

In contrast, the disclosed method and device advantageously permit the NVH behavior to be improved with reduced costs and while avoiding an additional motor load.

This is made possible according to the disclosure by means of the features specified herein.

A method for controlling a hydraulic brake system is provided, wherein the brake system comprises: a hydraulic pump which is driven by an electric motor and has the purpose of generating a fluid volume flow for the hydraulic brake system, a hydraulic connection for conducting the fluid volume flow between the hydraulic pump and a wheel brake, a reservoir for storing a fluid volume, wherein the reservoir is connected to the hydraulic connection by means of a switching valve, wherein the method is characterized according to the disclosure in that the switching valve is actuated in such a way that by this means a fluid pulsation in the hydraulic connection is counteracted.

For example, the control of a hydraulic brake system can be understood to be the control of an ESP system or of some other driver assistance system. Such a system generally has at least one electromagnetic switching valve for coupling a fluid reservoir to a hydraulic line. The fluid reservoir is, for example, the brake fluid reservoir which is positioned on the master brake cylinder. The hydraulic line is, for example, a fluid duct of an ESP module. A solenoid valve is to be understood as being, for example, a switching valve which is, for example, open in the currentless state and can be closed by electromagnetic activation. In this sense, actuation of the solenoid valve can be understood as meaning the adjustment of the valve setting. The adjustment of the fluid flow rate which can pass through the valve is also carried out in this way.

The counteraction of the fluid pulsation is achieved by virtue of the fact that the pressure fluctuations and/or the volume fluctuations in the brake system are reduced. The fluid pulsations in the line system are smoothed. Likewise, smoothing of a fluid pulsation at the wheel brake is brought about. For example, the optimization is carried out by avoiding or reducing the pulsations which arise as a result of the volume flow profile in a radial piston pump (for example 2 or 6 piston pumps, i.e. 2c system or 6c system) with an eccentric. Alternatively or additionally, the optimization takes the form of smoothing of the volume flow profile which is carried out, in particular, advantageously in the case of a 6c system. As a result, it is possible to achieve approximation to a constant delivered fluid volume flow.

In particular, optimized actuation of a brushless direct current motor (BLDC, brushless DC motor) is provided. Periodic actuation of the switching valve can advantageously take place—in particular synchronized with the rotor position of the pump motor.

Furthermore, costs for a static throttle can be saved and the motor load (pump load) in the case of highly dynamic maneuvers can be reduced. Therefore, such actuation advantageously avoids pressure pulsations, or at least reduces them. As a result, disruptive noises are avoided or at least reduced. In general, this leads to an improvement of the NVH (noise-vibration-harshness) behavior. The optimized actuation also advantageously makes a constant delivered fluid volume flow possible. Furthermore, the novel actuation results in a cost reduction, since it is possible to dispense with further physical damping measures in the hydraulic brake system, for example with the hydraulic capacitance and the throttle.

In one advantageous embodiment, the method is characterized in that the switching valve is actuated in such a way that by this means attenuation of the volume flow gradient from the hydraulic pump to the wheel brake is brought about.

This is understood as meaning that defined attenuation of the volume flow gradient is brought about by means of the actuation of the switching valve. As a result, the fluid volume flow from the pump to the wheel brake is therefore reduced. This partial fluid volume flow loss is brought about by the flowing out of fluid which is diverted to the fluid reservoir by the controlled switching valve. The diverted quantity is advantageously correspondingly adjusted and varied over time with the result that by this means a fluid pulsation is counteracted. As a result, an improvement in NVH is advantageously achieved. Furthermore, by this means smoothing of the volume flow profile can be achieved.

In one possible refinement, the method is characterized in that the switching valve is actuated in such a way that by this means a chronologically varying fluid volume flow loss from the hydraulic pump to the wheel brake is adjusted.

This is understood as meaning that the fluid volume flow profile from the pump to the wheel brake is varied by means of the actuation of the electromagnetic switching valve. The diverted quantity is advantageously correspondingly adjusted and varied over time, with the result that by this means a fluid pulsation is counteracted. As a result, an improvement in NVH is advantageously achieved. Furthermore, as a result smoothing of the volume flow profile can advantageously be achieved.

In one preferred embodiment, the method is characterized in that a degree of opening of the switching valve is varied periodically.

This is understood as meaning that the degree of opening of the switching valve is varied at a regular distance with, for example, a recurring pattern, in order to bring about a reduction in the fluid pulsation. The degree of opening (or stroke height) of the valve defines here the discharge quantity of the fluid in the direction of the reservoir. In this way, the quantity of fluid which is desired at the respective time and which is to be removed from the hydraulic connection is therefore adjusted by means of the actuation of the solenoid valve. This variation (modulation) takes place in such a way as to reduce or avoid the fluid pulsations. For example, for this purpose the rotational speed can be changed in a half sine shape in the case of a radial piston pump with 2 pistons. That is to say the opening profile of the valve is ideally matched to the existing pump structure. Owing to the pump structure with two identical pistons, the stroke profile is identical along the intake phase and delivery phase for both pumps and can therefore be set uniformly for both pistons. In the case of a pump structure with two pistons which are opposite one another, the respective ideal degree of opening continues to repeat every 180° rotational angle of the electric motor rotor.

In one alternative development, the method is characterized in that a degree of opening of the switching valve is varied during one revolution of the electric motor.

This is understood as meaning that the degree of opening of the switching valve (in particular of the switch-over valve) is modulated during one revolution of the rotor of the electric motor in such a way that a fluid pulsation is counteracted. That is to say the stroke height of the valve is varied during one revolution of the electric motor of the pump, in order to reduce fluid pulsations and to reduce their propagation and therefore bring about a reduction in the fluid pulsations at the wheel brake. Of course, it is also possible to provide for the stroke profile to be varied during a plurality of revolutions or during one part of a revolution. For example, the stroke profile in the case of a 2c system is defined for a half revolution (half sine shape). The stroke height of the valve is varied here or defined specifically in the course of this half revolution of the rotor of the pump motor.

In one preferred embodiment, the method is characterized in that the switching valve is actuated taking into account the pump setting.

This is understood as meaning that the optimized actuation of the switching valve (in particular of the switch-over valve) is carried out on the basis of or as a function of the position of the hydraulic pump. The degree of opening of the valve can be determined here, for example, as a function of the pump setting. Pump setting is understood to be the state or a position of the pump. The pump setting can be defined by means of the state of a pump component, for example from the rotational angle of the pump or the rotor position of the electric motor which drives the pump. The optimized actuation of the switching valve is as a result configured as a rotational-angle-dependent actuation. In this context, the current pump setting can advantageously be taken into account or else a pump setting which is to be expected at a defined point in time—in particular in a close interval.

In one advantageous refinement, the method is characterized in that a degree of opening of the switching valve is adjusted as a function of a rotor position of the electric motor of the hydraulic pump.

This is understood as meaning that the degree of opening (or the stroke height) of the switching valve (in particular of the switch-over valve) is modulated as a function of a rotor position of the electric motor in such a way that the fluid pulsation in the hydraulic brake system is counteracted. Therefore, a rotational-angle-dependent actuation of the switching valve takes place in order to reduce the fluid pulsation in the hydraulic system. For example, in a first rotor position a first stroke height is set and in a second rotor position a second stroke height is set which is different from the first stroke height. In principle, the suitable stroke height can be set at every rotor position. Such an implementation corresponds to the definition of an armature stroke profile over the angular setting of the rotor or of a hydraulic resistance profile over the time of one revolution. For this, a rotor position sensor is advantageously used and evaluated. On the basis of the rotor position which is determined in this way it is possible to define and apply a suitable actuation current strength for the coil of the electromagnetic switching valve.

In one possible embodiment, the method is characterized in that actuation of the electric motor of the hydraulic pump is adapted taking into account the actuation of the switching valve, in particular in that when the switching valve is opened the rotational speed of the electric motor is increased in order to at least partially compensate the discharge of fluid volume.

This is understood as meaning that a suitable actuation of the switching valve (in particular of the switch-over valve) takes place together with adapted control of the pump motor. As a result of the actuation of the switching valve, part of the volume flow is lost via the switching valve (or diverted to the reservoir), which can be compensated by slightly raising the motor rotational speed. The improvement with respect to the "pump rattling" (NVH behavior) is advantageously maintained here.

In one preferred embodiment, the method is characterized in that the method comprises at least one of the following steps:
  defining the volume flow of the hydraulic pump,
  determining the necessary pressure difference between pump and wheel brake in order to smooth the fluid pulsation,
  determining a necessary control flow in order to set a degree of opening of the switching valve, by means of which the necessary pressure difference is brought about on the basis of the attenuation, formed as a result thereof, of the volume flow gradient,
  actuating the switching valve with the determined control flow in order to set the corresponding degree of opening of the switching valve, determining the volume flow loss which is brought about, and a necessary increase in rotational speed of the hydraulic pump in order to compensate the volume flow loss, and actuating the hydraulic pump in order to set the necessary increase in the rotational speed in order to compensate the volume flow loss.

Each step can advantageously be configured as a function of the pump setting or the rotor position of the electric motor of the pump. Furthermore, the method advantageously comprises all the steps.

This method can be implemented, for example, using software or hardware or using a mixed form of software and hardware, for example in a control unit. It is therefore possible to provide a control unit for controlling a switching valve (in particular a switch-over valve) and/or a brushless direct current motor for driving a pump of a pressure supply unit of a driver assistance system for a hydraulic brake system which is configured to carry out the described method.

The approach which is presented here additionally provides a device which is designed to carry out, actuate or implement the steps of a variant of a method presented here, in corresponding devices. This embodiment variant, in the form of a device, can also quickly and efficiently solve the problem on which the disclosure is based. A device can be understood here to be an electrical device which processes sensor signals and outputs control signals and/or data signals as a function thereof. The device can have an interface which can be embodied by means of hardware and/or software. In the case of a hardware embodiment, the interfaces may be, for example, part of what is referred to as a system ASIC, which includes a wide variety of functions of the device. However, it is also possible for the interfaces to be separate integrated circuits or to be composed at least partially of discrete components. In the case of a software embodiment, the interfaces can be software modules which are present, for example on a microcontroller in addition to other software modules.

A computer program product or computer program with program code which can be stored on a machine-readable carrier or storage medium such as a semiconductor memory, a hard disk memory or an optical memory and is used to carry out, implement and/or actuate the steps of the method according to one of the embodiments described above, in particular when the program product or program is executed on a computer or a device, is also advantageous.

A device can furthermore also be understood here to be a brushless direct current motor for driving a pump of a hydraulic brake system, wherein the direct current motor comprises a rotor position sensor.

A device is also to be understood to be a hydraulic brake system which is configured to carry out the method described, wherein the brake system is free of a static throttle in order to smooth a fluid pulsation at the wheel brake or in order to avoid or reduce the fluid pulsation in the hydraulic connection. In contrast, there is advantageously provision that the function of the throttle is performed by means of the switching valve. In particular, the switch-over valve (USV) is advantageously used for this. As a result, a component of the fluid volume flow is diverted from the hydraulic connection in the direction of the reservoir according to requirements, in order to avoid or reduce a fluid pulsation in the hydraulic connection.

BRIEF DESCRIPTION OF THE DRAWINGS

It is to be noted that the features which are specified individually in the description can be combined with one another in any desired technically appropriate way and indicate further refinements of the disclosure. Further features and the expediency of the disclosure emerge from the description of exemplary embodiments on the basis of the appended figures, of which.

DETAILED DESCRIPTION

Figure 1:
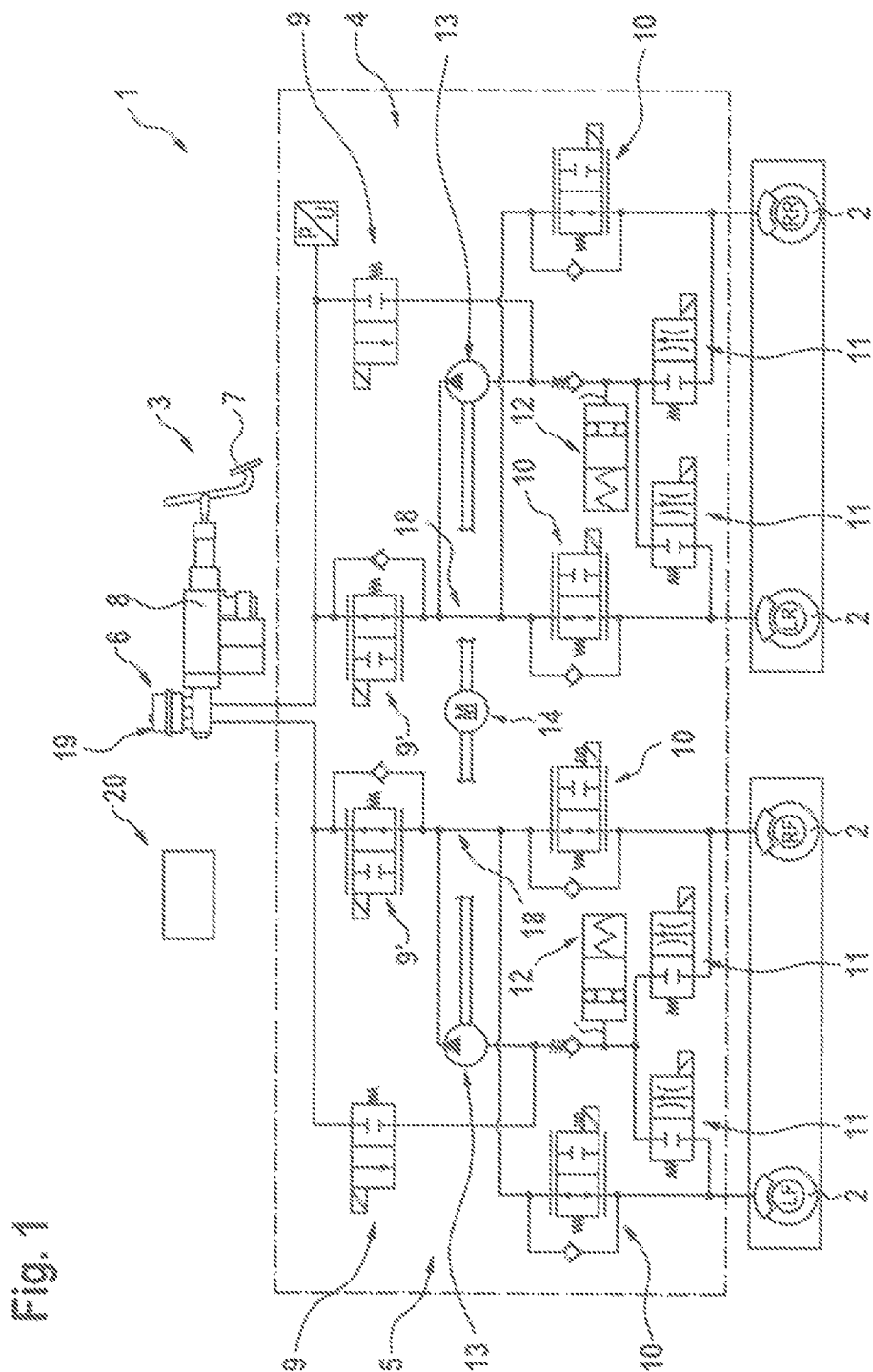
FIG. 1 shows a brake system of a motor vehicle in a simplified illustration.

FIG. 1 shows a simplified illustration of a brake system 1 for a motor vehicle (not illustrated in more detail here). The brake system 1 has a plurality of wheel brakes 2 which can be activated by a driver of the motor vehicle by a brake pedal device 3 as service brakes. The wheel brakes 2 are denoted here by LR, RF, LF and RR, which clarifies their position or assignment on the motor vehicle, where LR stands for left rear, RF stands for right front, LF stands for left front and RR stands for right rear. Two brake circuits 4 and 5 are formed between the brake pedal device 3 and the wheel brakes 2, wherein the brake circuit 4 is assigned to the wheel brakes LF and RR, and the brake circuit 5 is assigned to the wheel brakes LR and RF. The two brake circuits 4 and 5 are of identical design, and the design of the two brake circuits 4, 5 will therefore be explained in more detail below with reference to the brake circuit 4.

The brake circuit 4 is firstly connected to a master brake cylinder 6 of the brake pedal device 3, wherein the brake pedal device 3 also has a brake pedal 7 which can be activated by the driver and a brake booster 8. The brake booster 8 can be actuated, for example, pneumatically or electromechanically. The brake circuit 4 has a switch-over valve 9' and a high-pressure switching valve 9, which are connected in parallel with one another and follow the master brake cylinder 6. The switch-over valve 9' is designed so as to be open in the currentless state and permits a flow of the hydraulic medium of the brake circuit, that is to say the brake fluid, in both directions. The high-pressure switching valve 9 is designed so as to be closed in the currentless state, and in the energized state it permits a through flow of brake fluid only in the direction of the wheel brakes 2. The switch-over valve 9' is also connected to the two wheel brakes 2 with intermediate connection of in each case an inlet valve 10 which is designed to be opened in both directions in the currentless state. If the two switch-over valves 9' of the brake circuits 4, 5 are closed, the hydraulic pressure remains shut in or maintained in the section of the brake circuits 4, 5 which lies behind, that is to say between, the switch-over valves 9' and the wheel brakes 2, even if the brake pedal 7 is relieved of loading by the driver. If the switch-over valves 9' are opened, a connection of the brake circuits 4, 5 to the reservoir 19 is produced.

The wheel brakes 2 of the brake circuit 4 are also each assigned an outlet valve 11 which is designed so as to be closed in the currentless state. The outlet valves 11 have a hydraulic pressure accumulator 12 connected downstream of them. The outlet valves 11 are also connected on the outlet sides to a suction side of a pump 13 which is connected to the brake circuit 4 on the pressure side between the switch-over valve 9' and the inlet valves 10. The pump 13 is mechanically coupled to an electric motor 14. There is provision that the electric motor 14 is assigned to the pumps 13 of both brake circuits 4 and 5. Alternatively there can also be provision that each brake circuit 4, 5 has a separate electric motor 14. A control unit 20 controls both the electric motor 14 and the valves 9, 9', 10, 11.

Figure 2:
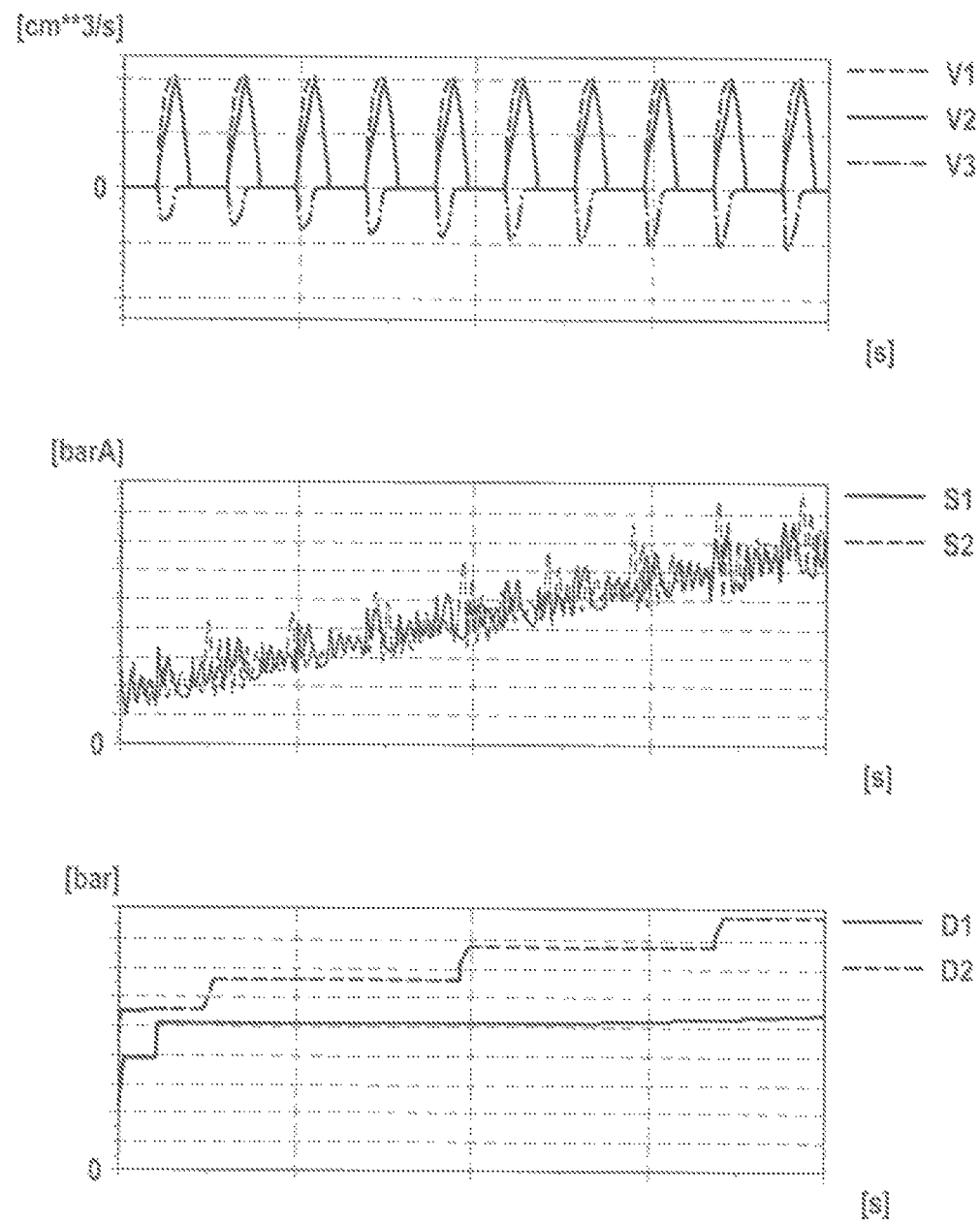
FIG. 2 shows characteristic curve profiles or pump rattling.

FIG. 2 shows an illustration of relevant characteristic curve profiles or "pump rattling". Opening the switch-over valve at the start of the delivery phase of a pump causes the initial pressure pulse to be partially diverted via the switch-over valve and the volume flow gradient to be attenuated. This reduces the pressure oscillation amplitude in the wheel line. A requirement for this is knowledge of the current rotor position of the motor. The top illustration in FIG. 2 shows the volume flows (as [cm³/s] plotted against the time [s]) with the disclosed measure implemented, both as V1 at the pump outlet (dashed line), and V2 on the wheel line (continuous line) as well as V3 at the switch-over valve itself (dot-dashed line). In the central illustration, the pressure downstream of the pump is shown (as [bar A] plotted against the time [s]) both as S1 (continuous line) with the disclosed measure implemented, and as S2 (dotted line) without the disclosed measure. In the bottom illustration, the pressure oscillation amplitude downstream of the pump is shown (as [bar] plotted against the time [s]). Here, the reduced pressure oscillation amplitude D1 (continuous line) can be seen with the disclosed measure implemented, in comparison with the normal pressure oscillation amplitude D2 (dashed line) without the disclosed measure.

Figure 3:
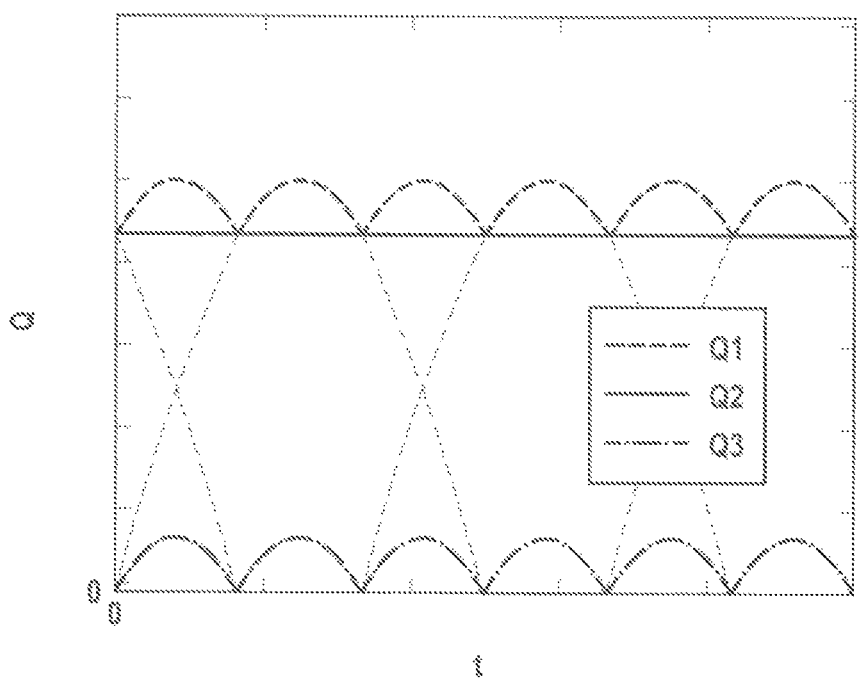
FIG. 3 shows characteristic curve profiles or volume flow smoothing.

FIG. 3 shows characteristic curve profiles relating to the volume flow smoothing. Pump systems with six pistons, referred to as 6c systems, generate a continuous volume flow, but owing to the finite number of pistons this is not constant but rather has fluctuations. The volume flow in the wheel lines can be smoothed by discharging just so much volume flow via the switch-over valve that a constant value is obtained for the wheel line:

$$Q_{USV} = Q_{PUMP} - Q_{Wheel\ line}$$

$$Q_{Wheel\ line} \stackrel{def}{=} const.$$

FIG. 3 shows here the smoothing of the volume flow of a 6c system in the wheel line by selective discharging of peaks via the switch-over valve. Here, the volume flow is illustrated plotted against the time. The dashed line shows the volume flow of the pump ($Q_{Pump}$). The dot-dashed line shows the (flowing-away) volume flow through the switch-over valve ($Q_{USV}$). The continuous line shows the resulting smoothed volume flow at the wheel brake ($Q_{Wheel}$).

It is to be noted that the scaling of the X axes and Y axes in the respective illustrations (a=prior art, b=embodiment of the disclosure) is the same. As a result, the differences can be easily determined.

The invention claimed is:

1. A method for controlling a hydraulic brake system, said hydraulic brake system including a hydraulic pump which is driven by an electric motor and generates a fluid volume flow for the hydraulic brake system, a hydraulic connection that conducts the fluid volume flow between the hydraulic pump and a wheel brake, and a reservoir that stores a fluid volume, the reservoir being connected to the hydraulic connection by a switching valve, the method comprising:
actuating the switching valve in such a way that a fluid pulsation in the hydraulic connection is counteracted; and
adapting actuation of the electric motor of the hydraulic pump taking into account the actuating of the switching valve by increasing a rotational speed of the electric motor when the switching valve is actuated to at least partially compensate for discharge of fluid volume through the switching valve.

2. The method according to claim 1, wherein the actuating of the switching valve includes actuating the switching valve so as to attenuate a volume flow gradient from the hydraulic pump to the wheel brake.

3. The method according to claim 1, wherein the actuating of the switching valve includes actuating the switching valve so as to adjust a chronologically varying fluid volume flow loss from the hydraulic pump to the wheel brake.

4. The method according to claim 1, wherein the actuating of the switching valve includes periodically varying a degree of opening of the switching valve.

5. The method according to claim 1, wherein the actuating of the switching valve includes varying a degree of opening of the switching valve during one revolution of the electric motor.

6. The method according to claim 1, wherein the actuating of the switching valve includes taking into account a pump setting.

7. The method according to claim 1, wherein the actuating of the switching valve includes adjusting a degree of opening of the switching valve as a function of a rotor position of the electric motor of the hydraulic pump.

8. The method according to claim 1, further comprising:
defining the fluid volume flow of the hydraulic pump.

9. The method according to claim 1, further comprising:
determining a pressure difference between the hydraulic pump and the wheel brake that is required to smooth the fluid pulsation.

10. The method according to claim 9, further comprising:
determining a control flow resulting from a degree of opening of the switching valve that results in the pressure difference due to an attenuation of a volume flow gradient.

11. The method according to claim 10, further comprising:
actuating the switching valve based on the control flow to set the degree of opening of the switching valve.

12. The method according to claim 1, further comprising:
determining a volume flow loss, and an increase in rotational speed of the hydraulic pump that compensates for the volume flow loss.

13. The method according to claim 12, further comprising:
actuating the hydraulic pump in order to set the increase in rotational speed to compensate for the volume flow loss.

14. A method for controlling a hydraulic brake system, said hydraulic brake system including a hydraulic pump which is driven by an electric motor and generates a fluid volume flow for the hydraulic brake system, a hydraulic connection that conducts the fluid volume flow between the hydraulic pump and a wheel brake, and a reservoir that stores a fluid volume, the reservoir being connected to the hydraulic connection by a switching valve, the method comprising:
actuating the switching valve in such a way that a fluid pulsation in the hydraulic connection is counteracted; and
at least one of the following steps:
defining the fluid volume flow of the hydraulic pump;
determining a pressure difference between the hydraulic pump and the wheel brake that is required to smooth the fluid pulsation;

determining a control flow resulting from a degree of opening of the switching valve that results in the pressure difference due to an attenuation of a volume flow gradient;

actuating the switching valve based on the control flow to set the degree of opening of the switching valve;

determining a volume flow loss, and an increase in rotational speed of the hydraulic pump that compensates for the volume flow loss; and actuating the hydraulic pump in order to set the increase in rotational speed to compensate for the volume flow loss.

15. The method according to claim 14, further comprising:

adapting actuation of the electric motor of the hydraulic pump taking into account the actuating of the switching valve.

16. The method of claim 15, wherein the adapting of the actuation of the electric motor includes increasing a rotational speed of the electric motor during the actuating of the switching valve to at least partially compensate for a discharge of fluid volume through the switching valve.

17. A control unit of a hydraulic brake system that includes a hydraulic pump which is driven by an electric motor and generates a fluid volume flow for the hydraulic brake system, a hydraulic connection that conducts the fluid volume flow between the hydraulic pump and a wheel brake, and a reservoir that stores a fluid volume, the reservoir being connected to the hydraulic connection by a switching valve, said control unit comprising a processor configured to execute program instructions stored in a memory to:

actuate the switching valve in such a way that a fluid pulsation in the hydraulic connection is counteracted; and adapt actuation of the electric motor of the hydraulic pump taking into account the actuating of the switching valve by increasing a rotational speed of the electric motor when the switching valve is actuated to at least partially compensate for discharge of fluid volume through the switching valve.

\* \* \* \* \*